United States Patent
Naito (10) Patent No.: US 7,540,586 B2
(45) Date of Patent: Jun. 2, 2009

(54) RECORDING APPARATUS AND RECORDING METHOD

(75) Inventor: Hisatsugu Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 11/191,515

(22) Filed: Jul. 28, 2005

(65) Prior Publication Data

US 2006/0031862 A1    Feb. 9, 2006

(30) Foreign Application Priority Data

Aug. 9, 2004    (JP) ............................. 2004-232726

(51) Int. Cl.
    *B41J 23/00*    (2006.01)
(52) U.S. Cl. ...................................................... 347/37
(58) Field of Classification Search ...................... None
    See application file for complete search history.

(56) References Cited

U.S. PATENT DOCUMENTS 5,595,380 A * 1/1997 McCue et al. .............. 271/9.09
6,352,332 B1 * 3/2002 Walker ......................... 347/19
6,467,900 B1 * 10/2002 Askren et al. ............... 347/104
2003/0095163 A1 * 5/2003 Otsuki et al. .................. 347/19
2005/0151315 A1 * 7/2005 Yokoi ......................... 271/145

FOREIGN PATENT DOCUMENTS

JP    2003-053953    2/1997

* cited by examiner

*Primary Examiner*—Stephen D Meier
*Assistant Examiner*—Alexander C Witkowski
(74) *Attorney, Agent, or Firm*—Canon USA Inc IP Div (57) ABSTRACT

A recording apparatus causes a recording head to scan a recording medium to perform recording on an area within the recording medium and on an overflow area adjacent to and outside the area within the recording medium, and includes a feed control unit for controlling feed of the recording medium in a feed direction different from a scanning direction of the recording head, such that the recording medium is fed during a period between a previous scan to perform recording and a next scan to perform recording, and controlling at least one of starting and stopping of the feed of the recording medium during a period in which the recording head scans the overflow area.

8 Claims, 8 Drawing Sheets

RECORDING APPARATUS AND RECORDING METHOD

BACKGROUND OF THE INVENTION

1. Field of the Invention

The present invention relates to recording apparatuses and recording methods, and specifically to a recording apparatus and a recording method that are capable of recording images on a recording medium without leaving a margin at the edge thereof, that is, capable of performing so-called borderless printing.

2. Description of the Related Art

These days, inkjet printers capable of recording images with the beauty and quality of silver salt photographs are examples of color inkjet recording apparatuses. On the other hand, since digital cameras are widely available, there are increasing demands for easily printing images taken with a camera as card-sized or L-sized prints, or large-sized prints, such as A4-sized or A3-sized prints, using an inkjet printer. Some recording apparatuses for printing photographs are configured to perform so-called borderless printing, which produces prints without a white border, like silver salt photographs.

Inkjet printers use one of the following two methods to perform borderless printing. The first method is to prepare a recording medium (recording paper) with a tear-off section on the four edges of the medium, allow images to be recorded on the tear-off section as well as on the inside section, and then trim the tear-off section after recording. The second method is to prepare a recording medium without a tear-off section, and allow images to be recorded off the edges of the recording medium (that is, record images on the entire surface of the recording medium so as not to leave a margin at the edges of the medium).

The second method is mainly used these days, as it has an advantage in that there is no need for an additional operation, such as the trimming of a tear-off section after recording. In both of the two methods, an area on which images are recorded and which is off the edges of the resultant recording medium with images printed thereon (for example, an area on which ink droplets have been ejected and which lies outside the recording medium with a size corresponds to the size of printed material to be ultimately obtained) will be hereinafter referred to as an "overflow area" or "outside area".

However, borderless printing according to both of the two methods has a problem in that it takes more time in performing recording operations than that in the case of printing of a normal print with borders. For example, if recording is performed, by serial scanning, on recording media of the same size, the width of the recording area in the direction of scanning for printing a photo with borders is smaller, by the width of the borders at both ends, than the width of the recording medium in the scanning direction. On the other hand, for printing a photo without borders, the width of the recording area in the scanning direction is larger than the width of the recording medium in the scanning direction by the width of the above-described overflow (outside) areas at both ends. That is, compared to the printing of a photo with borders, borderless printing involves the additional amount of scanning by the width of borders and overflow (outside) areas at both ends of the recording medium. This increases the total amount of time required for performing a predetermined amount (such as one page) of recording.

Figure 3:
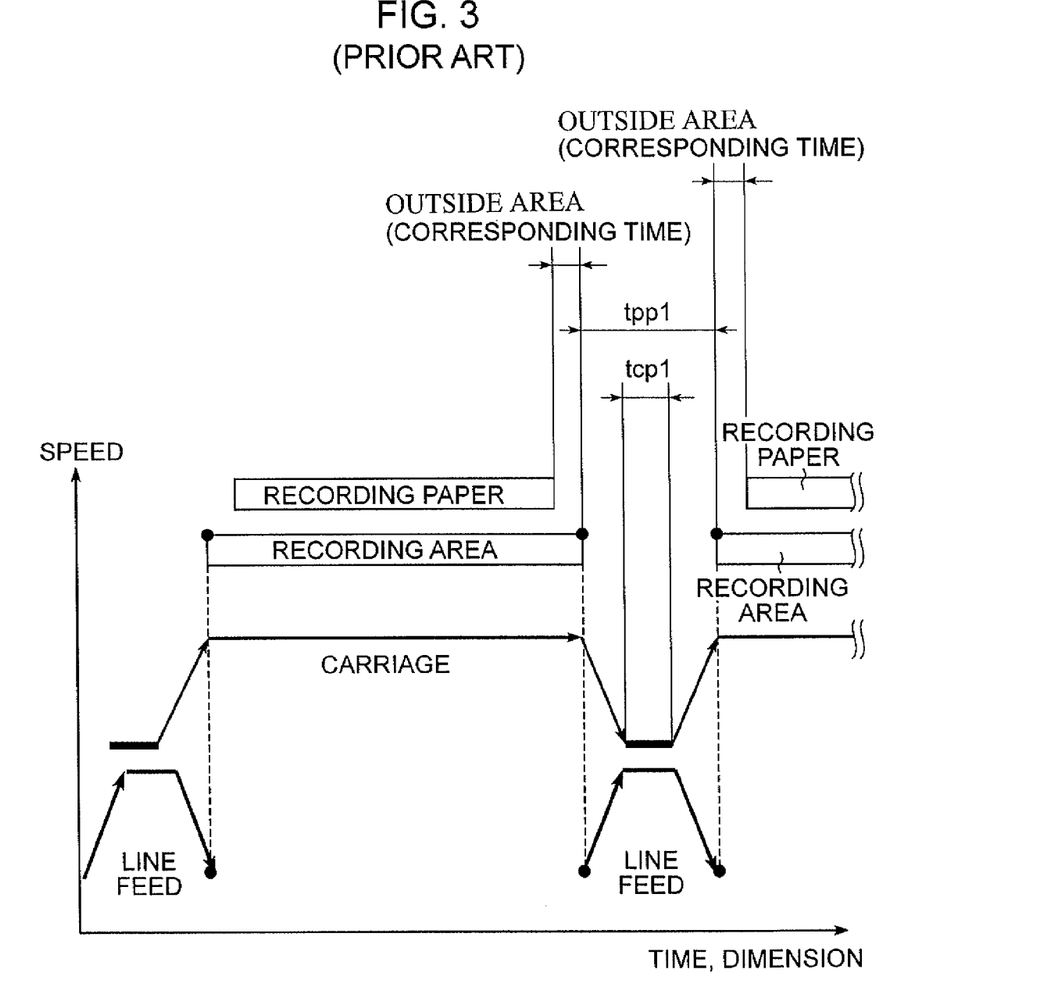
FIG. 3 shows the relationship between a carriage operation and a line feed operation in a borderless printing operation of a known example.

FIG. 3 shows the relationship between a carriage operation and a line feed operation in a borderless printing operation of a known example.

As shown in FIG. 3, in borderless printing, the width of the recording area is set to be larger than that of the recording medium (recording paper). This is to ensure reliable recording on the entire surface of the recording medium even if the recording medium is fed obliquely, and provides an effective method to allow image recording to be performed without leaving a margin at the edge of the recording medium. A recording area that extends off the recording medium corresponds to the overflow (outside) area described above.

Referring to FIG. 3, a carriage accelerates from a stopped state, and moves at a constant speed across the recording area to perform recording by ejecting ink droplets from a recording head. After moving at a constant speed across the recording area, the carriage decelerates and stops for time period tcp1. Then, the carriage accelerates again, moves at a constant speed, and performs recording on the subsequent recording area. The time interval between recording on a recording area and recording on the subsequent recording area includes a deceleration control period, a stop control period, and an acceleration control period for the carriage. Thus, the total time required for these control operations is time period tpp1 (>time period tcp1). That is, the time from the end of recording on one recording area to the start of recording on the next recording area is time period tpp1 as shown in FIG. 3.

In a serial inkjet printer, a line feed operation is performed during the interval between recording on one recording area and the next recording area (area adjacent to the previous recording area in the feed direction). This line feed operation is performed during time period tpp1 as in FIG. 3.

That is, line feed control is performed such that the line feed operation starts immediately after the completion of recording on the previous recording area, in other words, simultaneously with the start of the deceleration of the carriage. The line feed control is also performed such that the line feed operation ends at the start of recording on the next recording area, in other words, at the end of the acceleration of the carriage.

Therefore, the line feed operation starts after the completion of recording on an overflow (outside) area near the recording end position within the recording area, and the line feed operation ends before the start of recording on an overflow (outside) area near the recording start position within the recording area. Thus, in the known example, the period of recording on the overflow (outside) area does not overlap with that of the line feed operation. In other words, recording on the overflow (outside) area is not executed simultaneously with the line feed operation.

On the other hand, in Japanese Patent Laid-Open No. 2003-53953, a carriage is provided with a sensor for detecting the edge of a recording medium. In this case, control is performed, in borderless printing, such that a recording operation is not performed on areas off the edge. However, in such a structure, there are problems in that the addition of the sensor raises costs, increases the size of the carriage due to the positional relationship between the sensor and a recording head (particularly in the scanning direction), thereby causing an increase in the range of scanning.

SUMMARY OF THE INVENTION

The present invention is directed to provide a recording apparatus and a recording method that can reduce the predetermined amount of total recording time associated with borderless printing.

In one aspect of the present invention, a recording apparatus causing a recording head to scan a recording medium in a scanning direction to perform recording on an area within the recording medium and on an overflow area adjacent to and outside the area within the recording medium, includes: a feed control unit controlling feed of the recording medium in a feed direction different from the scanning direction of the recording head, such that the recording medium is fed during a period between a previous scan to perform recording and a next scan to perform recording, and controlling at least one of starting and stopping of the feed of the recording medium during a period in which the recording head scans the overflow area.

A recording method of the present invention causes a recording head to scan a recording medium to perform recording on an area within the recording medium and on an overflow area adjacent to and outside the area within the recording medium, includes: feeding the recording medium in a feed direction different from a scanning direction of the recording head; feeding the recording medium during a period between the previous scan to perform recording and the next scan to perform recording; and performing at least one of starting and stopping feeding the recording medium during a period in which the recording head scans the overflow area.

A time interval between one recording operation and the next recording operation can thus be reduced, compared to the case where a feed operation starts after the completion of a recording operation on a recording area, or a recording operation starts after the completion of a feed operation. Thus, the total amount of recording time required for borderless printing can be reduced.

Further features of the present invention will become apparent from the following description of exemplary embodiments with reference to the attached drawings.

DESCRIPTION OF THE EMBODIMENTS

The present invention will now be described in detail with reference to the drawings.

Figure 1:
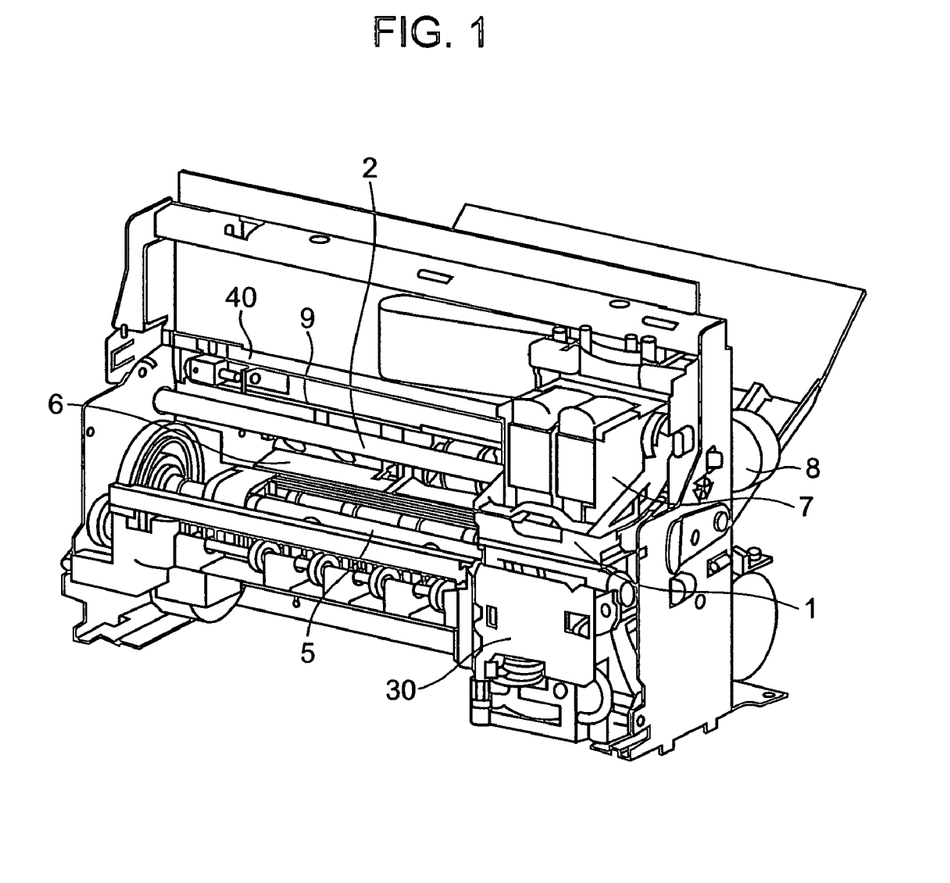
FIG. 1 is a perspective view showing an inkjet printer according to an embodiment of the present invention.

FIG. 1 is a perspective view showing an inkjet printer according to an embodiment of the present invention.

Referring to FIG. 1, a carriage 1 is movable along a guide shaft 2 and a guide rail (not shown). Driving force of a carriage motor 8 is transmitted through a belt 9 and causes the carriage 1 to reciprocate along the guide shaft 2. A recording head 7 and an ink tank are removably attached to the carriage 1. The reciprocating motion of the carriage 1 allows the recording head 7 to scan a recording medium in a reciprocating manner. A line feed (LF) roller 5 and a platen 6 that are rotatably held by the chassis of the printer stretch along the scanning range of the recording head 7. A recording medium can be fed over the platen by rotating the LF roller 5.

In performing a recording operation, the carriage 1 is accelerated from a stopped state and moves in a constant speed. According to data to be recorded, which has been sent from a host device, the carriage 1 causes the recording head 7 to eject ink droplets during its movement at a constant speed. Upon completion of the operation to cause the recording head 7 to perform a line of recording operation (ejection of ink droplets), the carriage 1 is decelerated and stopped. An encoder scale 40 is marked at, for example, 300 lines per inch (lpi) at regular intervals (25.4 mm/300=84.6 µm). An encoder sensor secured to the carriage 1 detects the marks. The position of the carriage 1 can thus be detected. An optical encoder or a magnetic encoder can be used here. The detected position information is compared with set values of start and end positions on a window that is for determining the recording positions of lines of nozzles arranged in the recording head described below. Control is performed such that ink ejection from the nozzles starts at a point at which the start position matches the position information, and ends at a point at which the end position matches the position information. During scanning, the speed of the carriage 1 can be calculated based on the time interval of sequential detection of marks on the linear encoder scale 40.

Figure 2:
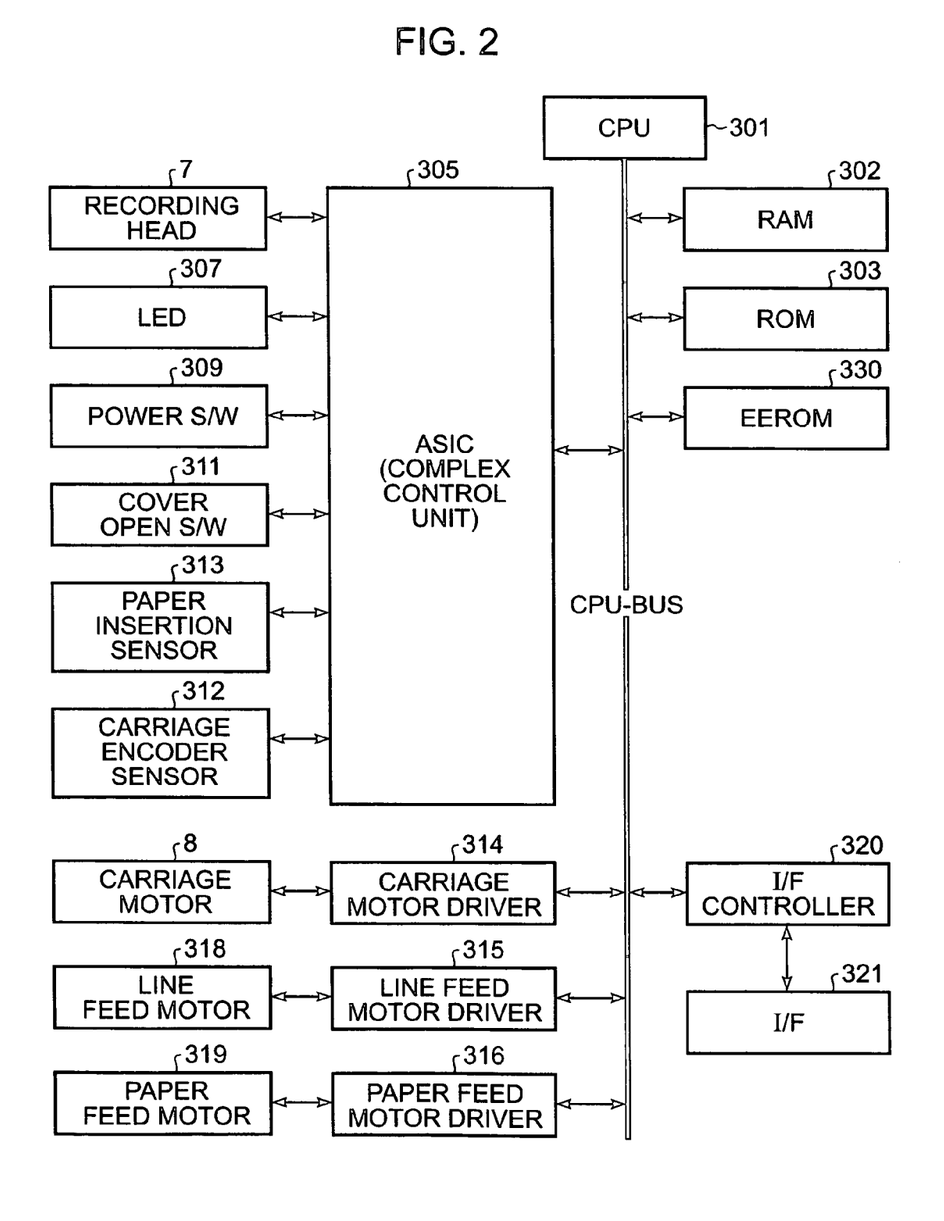
FIG. 2 is a block diagram mainly showing the control structure of the inkjet printer in FIG. 1.

FIG. 2 is a block diagram mainly showing the control structure of the inkjet printer in FIG. 1.

Referring to FIG. 2, a central processing unit (CPU) 301 controls the entire printer and executes various control operations for the printer according to a control program stored in a read-only memory (ROM) 303. Specifically, the CPU 301 controls the rotation of three motors (the carriage motor 8, a line-feed motor 318, and a paper-feed motor 319) via a carriage motor driver 314, a line-feed motor driver 315, and a paper-feed motor driver 316. The CPU 301 controls the rotation based on various signals inputted, via a complex control unit (application-specific integrated circuit (ASIC)) 305, from two sensors (a carriage encoder sensor 312 and a paper insertion sensor 313) and switches (a power S/W 309 and a cover open S/W 311). The CPU 301 also controls the rotation based on recording commands read from an interface (I/F) controller 320 and sent from a host to an I/F 321. The CPU 301 also controls recording operations, including the output of data, which is to be recorded, via the complex control unit 305 to a recording head (inkjet head) 7, and ink ejection from the recording head.

A random-access memory (printer RAM, a temporary memory) 302 serves as a receive buffer for temporarily storing expanded data for recording and data (recording commands and data to be recorded) received from the host. In addition, the RAM 302 serves as a workspace for storing necessary information including the speed of recording, and provides the CPU 301 with a work area. The ROM (printer ROM) 303 stores programs to be executed by the CPU 301, such as a recording control program for transferring data to the recording head and causing the recording head to perform recording, a program for controlling the carriage and a line feed operation, and a printer emulation program, or recording fonts. These programs include processing programs associated with recording control described below with reference to FIGS. 7 to 10.

The complex control unit 305 drives the recording head 7, turns a power LED 307 on/off or causes the power LED 307 to blink, and performs the detection of the power S/W 309, the cover open S/W 311, and the paper insertion sensor 313. The carriage motor driver 314, the line-feed motor driver 315, and the paper-feed motor driver 316, which are controlled by the CPU 301, are connected to the carriage motor 8, the line-feed motor 318, and the paper-feed motor 319, respectively, and drives these corresponding motors. The carriage motor 8 includes a direct current (DC) servomotor for performing servo control, and the line-feed motor 318 and the paper-feed motor 319 include stepping motors to be easily controlled by the CPU 301. The I/F controller 320 is connected via the I/F 321 to a computer serving as a host device. The I/F controller 320 is an interactive interface, such as a Centronics interface or a universal serial bus (USB) interface, that receives data to be recorded and command data from the computer, and sends error information on the printer side. A nonvolatile random access memory (EEROM) 330 stores, for example, registration values, the number of sheets of recording paper, the number of dots to be recorded, the number of times of ink-tank replacement, the number of times of recording-head replacement, and the number of cleaning operations executed in response to user requests. The nonvolatile random access memory 330 does not lose its contents when the power supply to the computer is turned off.

Embodiments of borderless printing operations in an inkjet printer having the above-described structure will now be described.

First Embodiment

Figure 4:
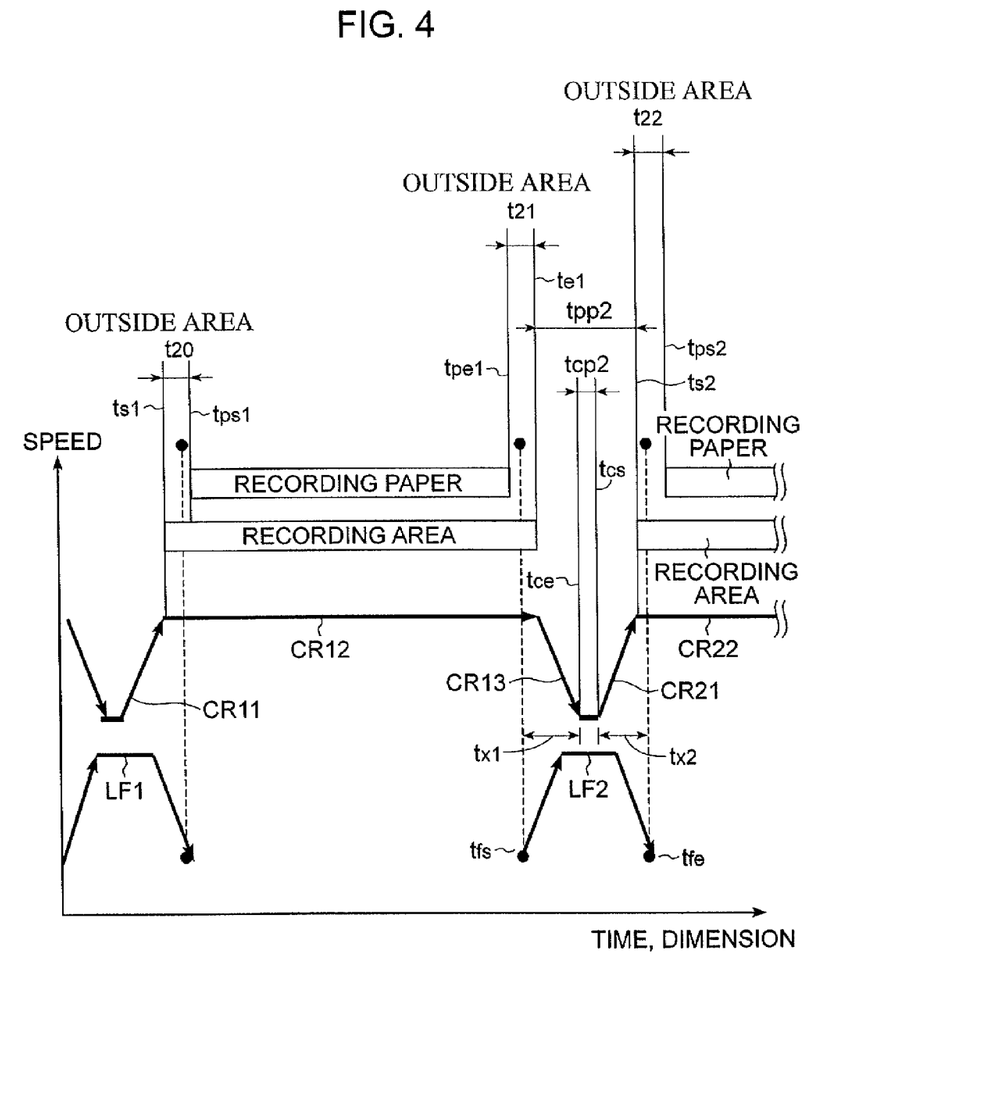
FIG. 4 shows the relationship between a carriage operation and a line feed operation in borderless printing according to a first embodiment of the present invention.

FIG. 4 shows the relationship between a carriage operation and a line feed operation in borderless printing in the first embodiment. In the drawing, time elapses from left to right. The vertical axis represents speed.

Symbols CR1x and CR2x represent scanning operations of the recording head (scanning operations of the carriage). For example, symbols CR11, CR12, and CR13 indicate that acceleration control, constant speed control, and deceleration control, respectively, are performed. Symbols CR21, CR22, and CR23 also represent acceleration control, constant speed control, and deceleration control, respectively. Symbols LF1 and LF2 represent feed operations for feeding recording media.

The upper part of FIG. 4 shows the relationship between recording paper (recording medium) and a recording area. "Overflow areas" or "outside areas" are outside but adjacent to both sides of the recording paper.

For example, scanning operations represented by CR1x are performed in the following order. First, a scanning operation of the recording head 7 starts. Then, a recording operation (from time ts1 to time tps1) on an "overflow (outside) area (first overflow (outside) area)", a recording operation on the recording medium (from time tpsl to time tpe1), and a recording operation (from time tpe1 to time te1) on another "overflow (outside) area (second overflow (outside) area)" are performed.

Time ts1 corresponds to the beginning of the "first overflow (outside) area" located upstream of the recording medium in the scanning direction. Time tpsl corresponds to the end of the "first overflow (outside) area".

Similarly, time tpe1 corresponds to the beginning of the "second overflow (outside) area" located downstream of the recording medium in the scanning direction. Time te1 corresponds to the end of the "second overflow (outside) area".

As will be described below, the present embodiment is characterized in that a line feed operation starts during the recording operation on an "overflow (outside) area" located within the recording area but outside the recording medium. The present embodiment is also characterized in that the line feed operation ends during the recording operation on an "overflow (outside) area" located within the recording area but outside the recording medium.

The simultaneous execution of the scanning of the recording head 7 and feeding of the recording medium is expressed as cross control. This cross control is performed during time periods tx1 and tx2 as in FIG. 4. For example, in time period tx1, control is performed such that the line-feed motor 318 is driven and accelerated during the constant-speed control period and deceleration control period for the carriage motor 8.

In FIG. 4, the relationship between the width of the recording area and the width of the recording medium (recording paper) is the same as that in the known example illustrated in FIG. 3. Also, similar to the known example in FIG. 3, after the completion of a recording operation on one recording area, the carriage 1 goes though a deceleration control period, a stop control period, and an acceleration control period, and then starts recording on the next recording area. The time period of the line feed operation (time required for the feed operation) is also the same as that in the known example in FIG. 3.

However, time period tcp2 during which the carriage stops in the present embodiment is shorter than time period tcp1 in the known example. Therefore, time period tpp2 between one scanning operation of the recording head and the next scanning operation of the recording head is shorter than time period tpp1 in the known example.

The reason is, as is obvious from FIG. 4, line feed control in the present embodiment is performed such that a line feed operation starts (time tfs) within time period t21 for performing a recording operation on an "overflow (outside) area", during the period between the end of recording on the recording medium (time tpe1) and the end of scanning of the recording head (time tce). Similarly, line feed control is performed such that a line feed operation ends (time tfe) within time period t22 for performing a recording operation on an "overflow (outside) area", during the period between the start of scanning of the recording head (time tcs) and the start of recording on the recording medium (time tps2).

In addition, line feed control is performed such that the line feed operation starts at time tfs before time te1 at which the recording operation on the overflow (outside) area located near the recording end position ends, and such that the line feed operation ends at time tfe after time ts2 at which the recording operation on the overflow (outside) area located near the recording start position starts.

As a result of such control, time period tcp1 during which the carriage stops in the known example is reduced to time period tcp2 by the amount of time for which the recording operation on the overflow (outside) area is performed in parallel with the feed operation. Moreover, time period tpp1 is reduced to time period tpp2.

This carriage control is not necessarily intended to reduce time period tcp2 itself. For example, the acceleration or deceleration of the carriage may be increased to reduce time period tpp2.

In the example described above, the recording operation on the recording area is performed during the time in which the carriage moves at a constant speed. However, the recording operation of the recording head may be performed during the time in which the carriage is under acceleration control or deceleration control. In this case, time period tcp2 during which the carriage stops in FIG. 4 may be the same as time period tcp1 in the known example in FIG. 3.

Thus, the above-described control can reduce the total amount of recording time required, for example, for a page of borderless printing, compared to the case in the known example in FIG. 3.

As described above, control is performed such that time tfs at which the line feed operation starts and time tfe at which the line feed operation ends are both within the time periods during which the recording operations on the overflow (outside) areas are performed. For example, if the line feed operation starts at time tpe1 corresponding to an end of the recording medium (recording paper), there is a possibility that the line feed operation is performed during the recording operation on the recording medium if the recording medium is displaced, in the width direction (scanning direction of the recording head), from its proper position. In such a case, images near the end of the recording medium are distorted. Therefore, in the present embodiment, the line feed operation starts and ends during the recording operation on the overflow (outside) areas.

Figure 5:
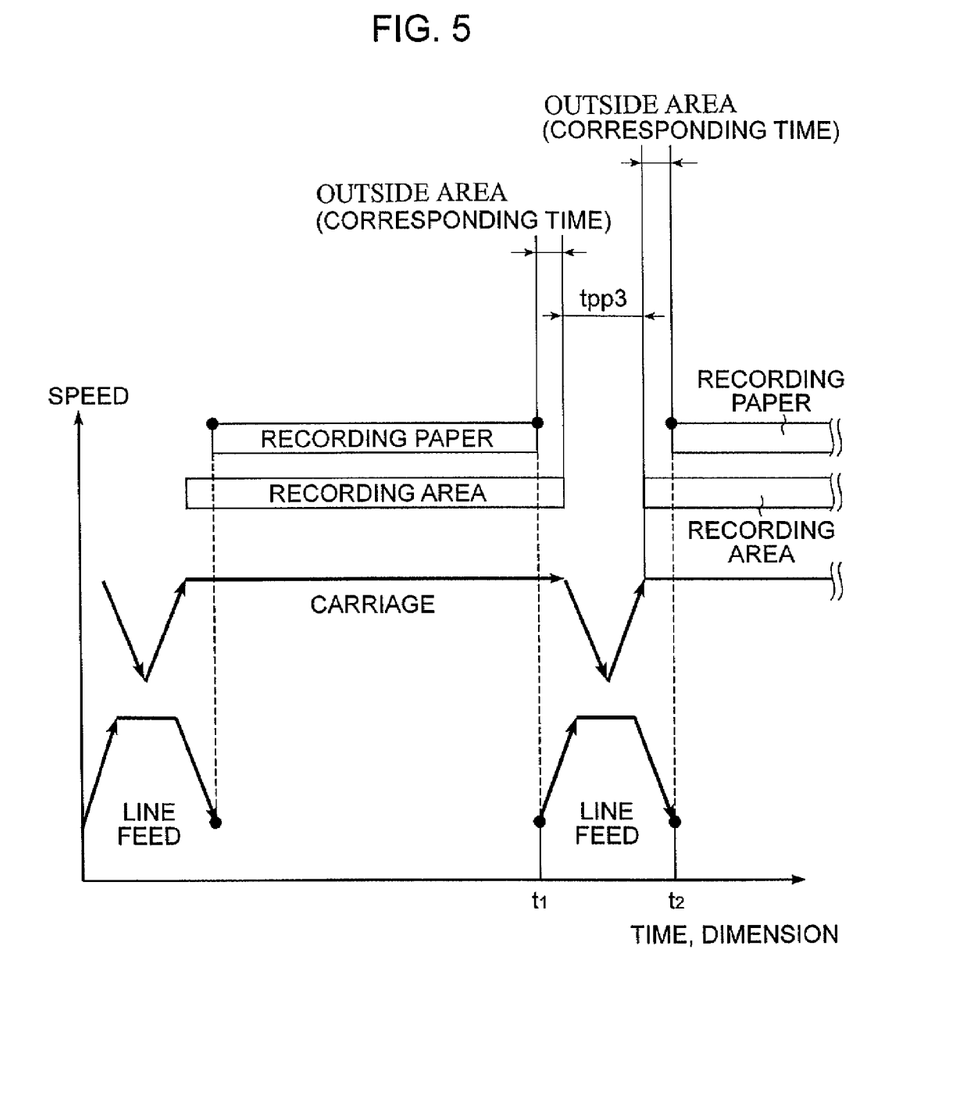
FIG. 5 shows a modification of the first embodiment and is basically the same as FIG. 4.

FIG. 5 shows a modification of the present embodiment of FIG. 4. The only difference is that the starting point of the line feed operation and the end point of the line feed operation corresponds to the edges of the recording medium (recording paper). In other words, control is performed such that the line feed operation starts at time t1 (that is, the point at which recording on the overflow (outside) area adjacent to the recording end position starts) corresponding to an edge of the recording medium (recording paper), and the line feed operation ends at time t2 (that is, the point at which recording on the overflow (outside) area adjacent to the recording start position ends) corresponding to another edge of the recording medium (recording paper). Thus, all the time for recording on the overflow (outside) areas is used for the line feed operation. Although there is little distortion of images in the case where the recording medium has been fed obliquely, time tpp3 between the recording operation on one recording area and the recording operation on the next recording area can further be reduced.

Second Embodiment

The first embodiment deals with the cross control with respect to the overflow (outside) areas on both sides of the recording area. On the other hand, the present embodiment deals with the cross control with respect to one of the overflow (outside) areas on both sides of the recording area.

A paper feed of the recording apparatus includes a loading member on which recording media are placed, and a regulation member (paper guide) for positioning the recording media in the width direction. The regulation member allows the recording media to be fed to a desired position along the width of the recording media (in the scanning direction of the recording head) on the platen.

One of the sides of the recording medium in the width direction is defined as a reference side. Cross control is performed, with the regulation member, on an overflow (outside) area corresponding to the reference side. No cross control is performed on an overflow (outside) area corresponding to the other side.

For example, the regulation member includes a fixed paper guide (member) and a movable paper guide (member) movable along the width of the recording medium. This allows the feeding of recording media with various widths. The fixed paper guide and the movable paper guide are provided on both sides of the recording media. One side (edge) on which the fixed paper guide is provided is used as a reference for the paper guides. Thus, the side on which the fixed paper guide is provided is expressed as a reference side, and the other side is expressed as a non-reference side. Such a method by which positioning along the width of the recording media is performed with reference to one side of the recording media is referred to as a so-called one-sided reference method.

Figure 6:
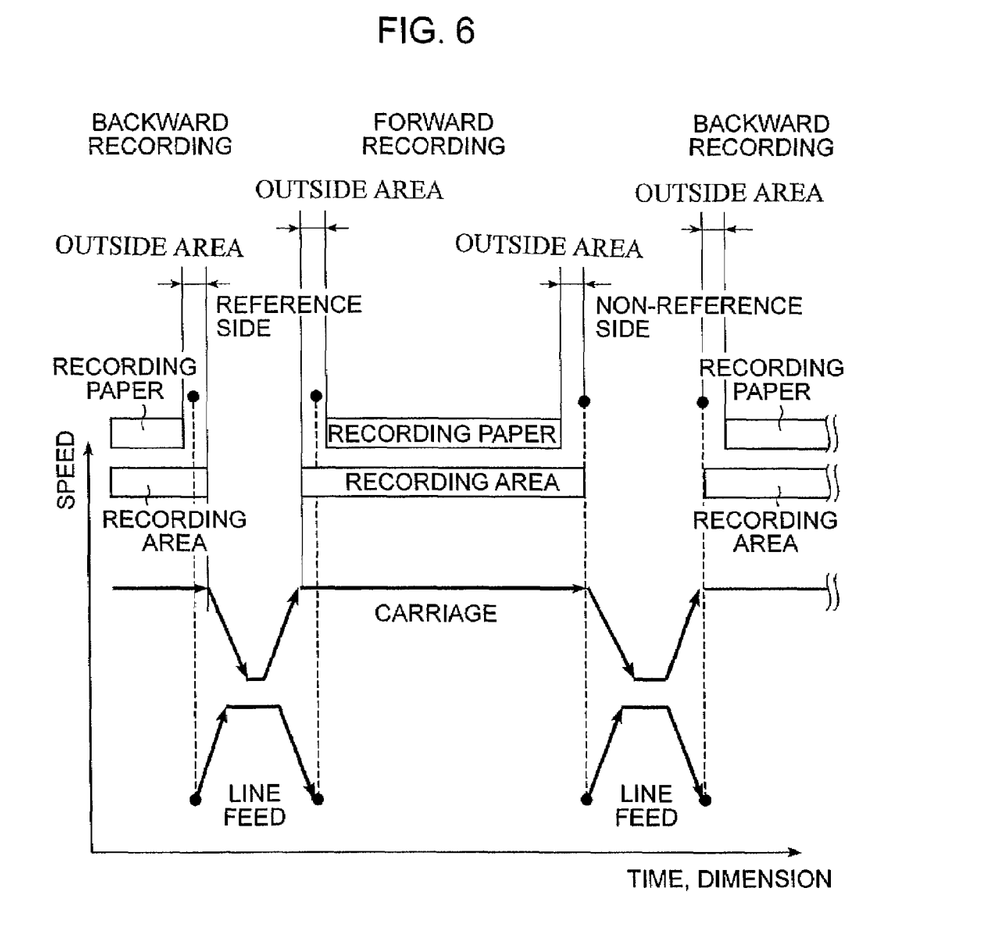
FIG. 6 shows the relationship between a carriage operation and a line feed operation in borderless printing according to a second embodiment of the present invention.

FIG. 6 shows the relationship between a carriage operation and a line feed operation in borderless printing according to the present embodiment. FIG. 6 shows that the reference side corresponds to the beginning of forward recording. As described above, cross control is performed only on the reference side, and is not performed on the non-reference side.

Since the fixed paper guide is provided on the reference side, the amount of displacement (deviation) along the width of the recording media is small. On the other hand, although the recording media are held by the movable paper guide, the amount of displacement on the non-reference side is relatively large compared to the case of the reference side.

Such displacement may be caused by the varying widths of the recording media placed on the loading member, for example, even among the same "A4-sized" paper. Displacement may also occur when the recording medium is not exactly rectangular, or depending on the condition of the recording medium being fed.

In such cases, increased cross-controlled periods (corresponding to time periods tx1 and tx2 in FIG. 4) on the non-reference side leads to an increased possibility that recording is performed on the recording medium during the line feed operation. Since this causes degradation in image quality, cross control is performed only on the reference side in the present embodiment, and not on the non-reference side.

In the example described above, cross control is performed only on the reference side and not on the non-reference side. However, cross control may be performed on both the reference side and the non-reference side and, in this case, the cross-controlled period on the non-reference side is shorter than that on the reference side.

Control Procedure

Control performed in the first and second embodiments will now be described.

Figure 7:
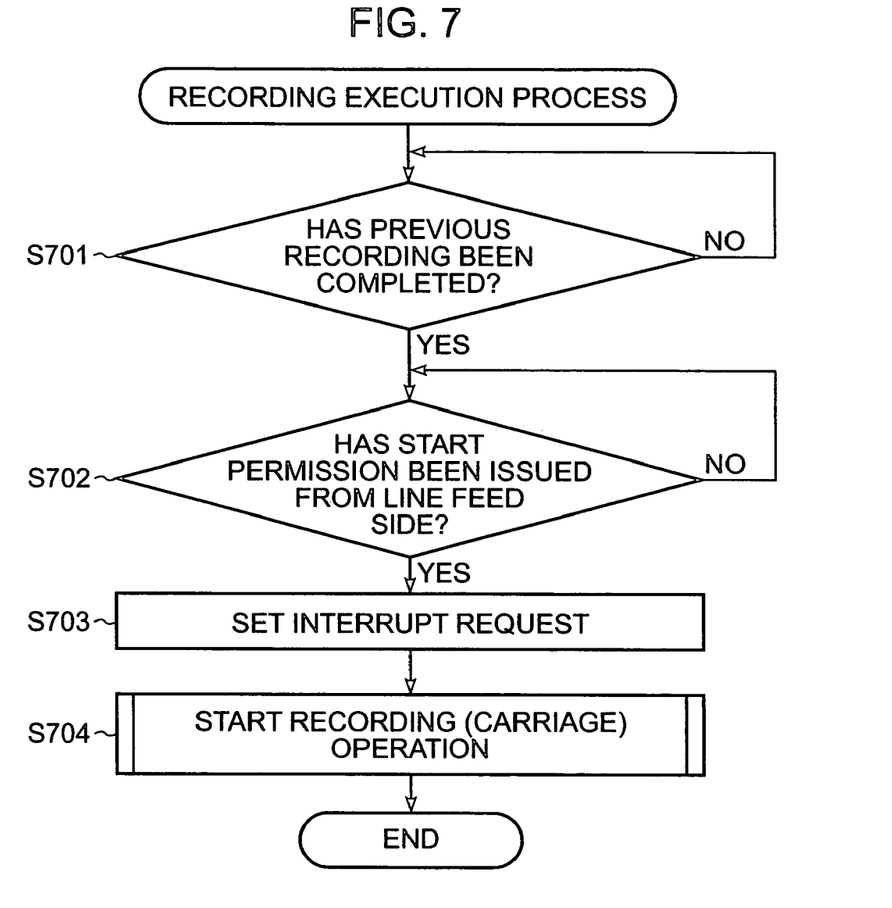
FIG. 7 is a flowchart showing a recording execution process in control operations according to the first and second embodiments.

FIG. 7 is a flowchart showing a recording execution process in control operations according to the first and second embodiments.

First, image data processed by the host computer is received by the interface on the printer side, subjected to a command analysis, and expanded in an internal recording buffer. The process of the execution of recording is thus started.

In step S701, it is determined whether or not the previous recording has been completed (the carriage stops). If it is determined that the previous recording is in progress, the process enters a wait state. If it is determined that the previous recording has been completed, it is determined in step S702 whether start permission for processing after the previous recording has been issued from an in-feed interrupt process. If no permission has been issued, the process enters a wait state.

If start permission has been issued from the in-feed interrupt process, an interrupt position is set such that an interrupt occurs earlier than the end of recording by the amount of time during which recording on an "overflow (outside) area" is performed in parallel with a feed operation. Then a carriage operation starts in step S704.

In the printer of the present embodiment, a DC motor serves as a drive source that causes the carriage to move. The DC motor is driven by servo control. When a timer for servo control is started, the DC motor causes the carriage to move based on positional information and speed information from an encoder. When the carriage reaches a predetermined position, a head is actuated to start ejecting ink droplets. An interrupt occurs when the carriage reaches the position set in step S703.

Figure 8:
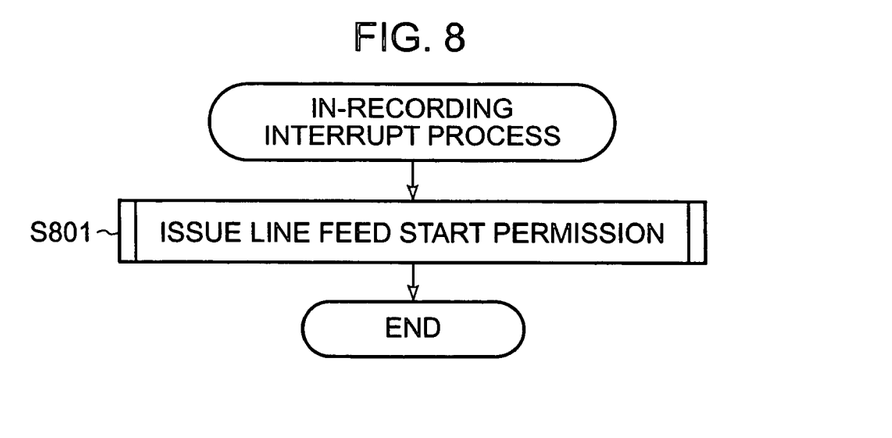
FIG. 8 is a flowchart showing an interrupt process executed when the carriage reaches a position determined in the process in FIG. 7.

FIG. 8 is a flowchart showing an interrupt process executed when the carriage reaches the position determined in the process in FIG. 7. As shown in FIG. 8, when an interrupt occurs, line-feed start permission is issued in step S801 and the process ends.

Figure 9:
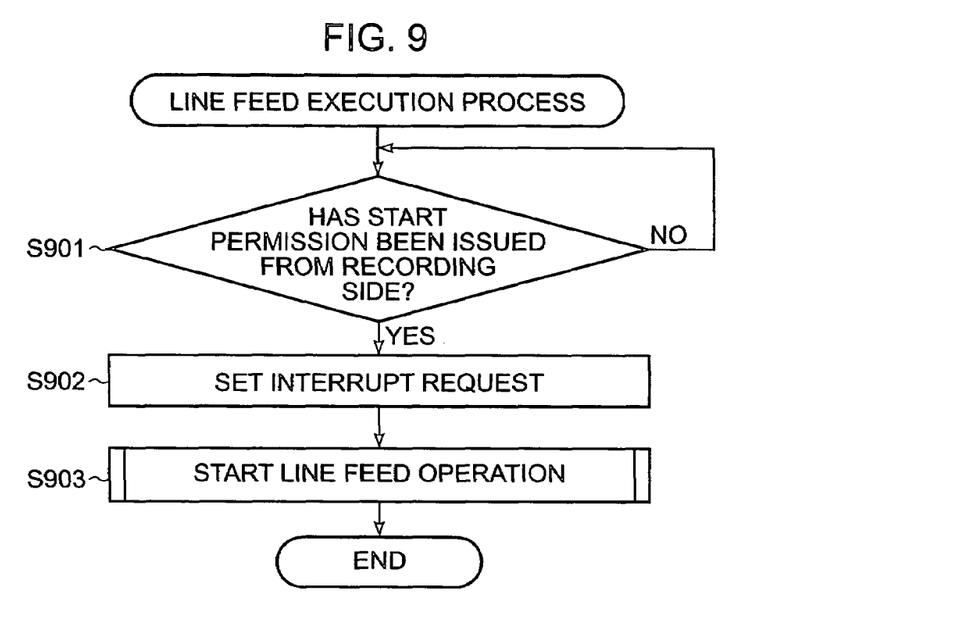
FIG. 9 is a flowchart showing a line-feed execution process in control operations according to the first and second embodiments.

FIG. 9 is a flowchart showing a line-feed execution process in control operations according to the first and second embodiments.

First, in step S901, it is determined whether or not feed start permission has been issued by the interrupt process executed when the carriage reaches a predetermined position. If it is determined that the permission has not been issued, the process enters a wait state. If feed start permission has been issued, an interrupt request is set in step S902 such that a carriage start order is issued earlier than estimated end time for the feed operation by the amounts of "time during which recording on an overflow (outside) area is performed in parallel with a feed operation" and "time required for carriage acceleration control". Then the feed operation starts in step S903. In the present embodiment, a pulse motor serves as a drive source for the feeding units. In the interrupt process, control is performed by varying time and phase signals for pulse drive to rotate the pulse motor.

Figure 10:
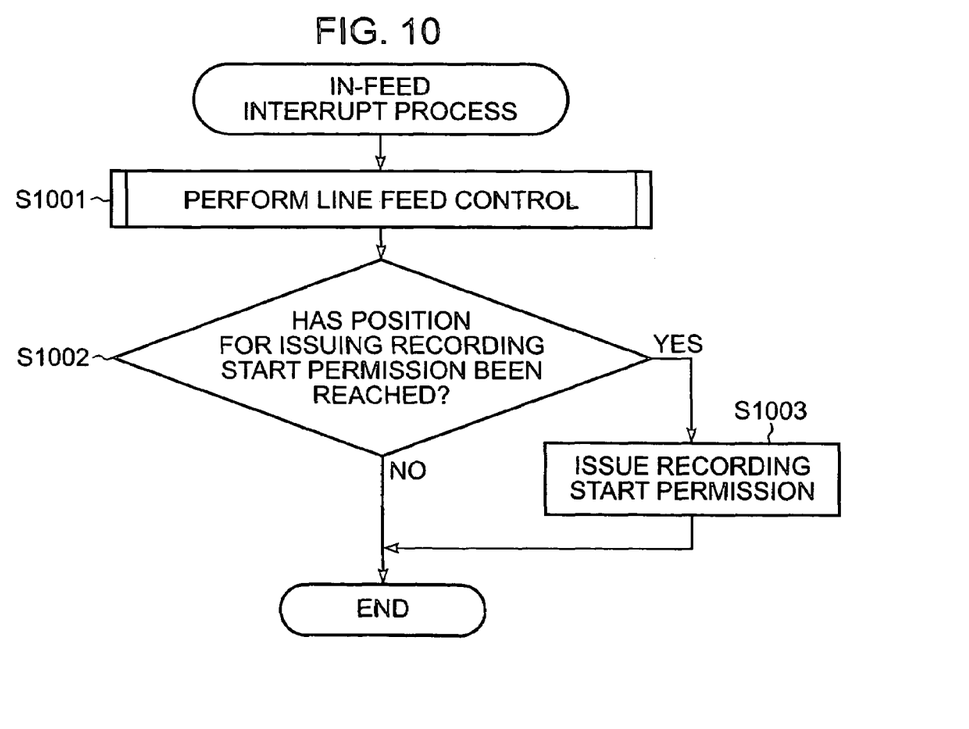
FIG. 10 is a flowchart showing an interrupt process for line feed control started in step S903 in FIG. 9.

FIG. 10 is a flowchart showing an interrupt process for line feed control started in step S903 in FIG. 9. In step S1001, processing is performed to drive the pulse motor. In step S1002, it is determined whether or not the current position (line feed position) is appropriate for issuing carriage start permission. If it is determined that a predetermined position has been reached, the carriage start permission is issued in step S1003.

Other Embodiments

The above-described recording apparatus receives image data from the host device to perform image recording on recording media. However, the form of the recording apparatus is not limited to this. The recording apparatus may be provided with an interface for accessing a storage medium, such as a memory card. In this case, the recording apparatus reads image data from the storage medium, not from the host device, to perform image recording on recording media.

The platen 6 may be provided with a platen opening (not shown) corresponding to the "overflow (outside) area", and the platen opening may be provided with a platen absorber (not shown).

Moreover, a DC motor, instead of the pulse motor described above, may serve as a drive source for the feeding units.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-232726 filed Aug. 9, 2004, which is hereby incorporated by reference herein in its entirety.

What is claimed is:

1. A recording apparatus causing a recording head to scan a recording medium in a scanning direction to perform recording on an area within the recording medium and on an outside area adjacent to and outside the area within the recording medium with regard to the scanning direction, the recording apparatus comprising:

a feed control unit controlling feed of the recording medium in a feed direction different from the scanning direction of the recording head, during a period between a previous scan to perform recording and a next scan to perform recording with regard to the same recording medium, wherein the feed control unit controls at least one of starting and stopping of the feed of the recording medium during a period in which the recording head performs recording on the outside area.

2. The recording apparatus according to claim 1, wherein the feed control unit controls at least one of control operations to start feeding the recording medium during a period in which the recording head records on an area stretching from an end of the area within the recording medium to an end of an adjacent outside area, and to stop feeding of the recording medium during a period in which the recording head performs recording on an area stretching from a beginning of an outside area to a beginning of the area within the recording medium.

3. The recording apparatus according to claim 1, wherein the feed control unit controls such that timing of the feed operation to be executed during the period in which the recording head performs scanning at one end of the recording medium differs from timing of the feed operation to be executed during the period in which the recording head performs scanning at the other end.

4. The recording apparatus according to claim 3, wherein, when the one end of the recording medium is defined as a reference position, the feed control unit controls such that time of the feed operation to be executed during the period in which the recording head performs scanning at the other one end of the recording medium is shorter than time of the feed operation to be executed during the period in which the recording head performs scanning at the one end of the recording medium.

5. The recording apparatus according to claim 4, further comprising:

a loading member supporting the recording media thereon; and a regulation member facilitating positioning the recording media on the loading member in the width direction, the regulation member having a reference side, wherein the one end of the width of the recording media is supported on the loading member to correspond to the reference side of the regulation member.

6. The recording apparatus according to claim 1, wherein the recording medium includes a main part corresponding to the area within the recording medium and end parts corresponding to the outside area, wherein the end parts are detachably attached from the main part.

7. The recording apparatus according to claim 1, wherein the recording head ejects ink droplets to perform recording.

8. A recording method for causing a recording head to scan a recording medium to perform recording on an area within the recording medium and on an outside area adjacent to and outside the area within the recording medium with regard to a scanning direction, the recording method comprising:

feeding the recording medium in a feed direction different from a scanning direction of the recording head; and performing at least one of starting and stopping feeding the recording medium during a period in which the recording head performs recording on the outside area, during a period between the previous scan to perform recording and the next scan to perform recording with regard to the same recording medium.

* * * * *